United States Patent
Gruhler

(10) Patent No.: US 8,468,894 B2
(45) Date of Patent: Jun. 25, 2013

(54) MEASURING CELL AND A METHOD OF USE THEREFOR

(75) Inventor: Holger Gruhler, Tuningen (DE)

(73) Assignee: Vega Grieshaber KG, Wolfach (DE)

( * ) Notice: Subject to any disclaimer, the term of this patent is extended or adjusted under 35 U.S.C. 154(b) by 342 days.

(21) Appl. No.: 12/859,061

(22) Filed: Aug. 18, 2010

(65) Prior Publication Data

US 2011/0100130 A1 May 5, 2011

(30) Foreign Application Priority Data

Nov. 2, 2009 (DE) .................. 10 2009 051 613

(51) Int. Cl.
*G01L 19/04* (2006.01)

(52) U.S. Cl.
USPC .............................................. 73/708; 73/700

(58) Field of Classification Search
None
See application file for complete search history.

(56) References Cited

U.S. PATENT DOCUMENTS

| | | | |
|---|---|---|---|
| 4,227,418 A | 10/1980 | Bonner et al. | |
| 4,924,701 A | 5/1990 | Delatorre | |
| 5,983,727 A * | 11/1999 | Wellman et al. | 73/724 |
| 6,122,972 A | 9/2000 | Crider | |
| 6,194,678 B1 * | 2/2001 | Yoshikawa et al. | 200/512 |
| 6,617,504 B2 * | 9/2003 | Kajihara et al. | 136/201 |
| 6,735,845 B2 * | 5/2004 | Jonsson | 29/595 |
| 7,137,301 B2 * | 11/2006 | Grudzien | 73/718 |
| 7,284,439 B2 * | 10/2007 | Jonsson | 73/724 |
| 7,316,163 B2 * | 1/2008 | Grudzien | 73/718 |
| 7,389,697 B2 * | 6/2008 | Jonsson | 73/724 |
| 7,624,643 B2 * | 12/2009 | Grudzien | 73/718 |
| 8,069,729 B2 * | 12/2011 | Dannhauer et al. | 73/708 |
| 2002/0191373 A1 * | 12/2002 | Williams | 361/687 |
| 2008/0223140 A1 | 9/2008 | Broden | |

FOREIGN PATENT DOCUMENTS

| | | |
|---|---|---|
| DE | 2021 479 | 5/1970 |
| DE | 24 61 424 | 7/1976 |
| DE | 3820418 A1 | 12/1988 |
| DE | 3943475 C2 | 7/1991 |
| DE | 41 33 009 C2 | 1/1996 |
| DE | 693 06 575 T2 | 4/1997 |
| DE | 19755192 A1 | 6/1999 |
| EP | 0 210 843 A2 | 2/1987 |
| EP | 1 186 875 B1 | 3/2002 |
| EP | 1183511 B1 | 8/2003 |
| EP | 1 884 757 A1 | 2/2008 |
| WO | WO 83/04308 | 12/1983 |

OTHER PUBLICATIONS

German Office Action for Serial No. DE 10 2009 051 611.5 filed Nov. 2, 2009, 3 pages, mailed Nov. 2, 2009; 3 pages—English translation.
U.S. Appl. No. 12/859,005 Office Action mailed Nov. 4, 2011, 13 pages.
U.S. Appl. No. 12/859,005 Response to Office Action filed Jan. 15, 2012, 10 pages.
U.S. Appl. No. 12/859,005 Notice of Allowance mailed Mar. 16, 2012, 9 pages.
Appln. Serial No. 10 2009 051 613.1, filed Nov. 2, 2009—Office Action mailed Oct. 15, 2010, 3 pages in German, 2 pages—English translation.
European Patent Appln. Serial No. 10 007 561.3 Search Report mailed Feb. 21, 2011, 7 pages in German, English translation—4 pages.

* cited by examiner

*Primary Examiner* — Lisa Caputo
*Assistant Examiner* — Jermaine Jenkins
(74) *Attorney, Agent, or Firm* — Andrew F. Young, Esq.; Lackenbach Siegel, LLP

(57) ABSTRACT

The present invention is a measuring cell with a base body, a measurement membrane which is arranged on the base body, and a measurement device, where a clearance between the measurement membrane and the base body is filled with a fluid which presents an increased heat conductivity ($\kappa$) compared to air.

19 Claims, 5 Drawing Sheets

MEASURING CELL AND A METHOD OF USE THEREFOR

CROSS REFERENCE TO RELATED APPLICATIONS

This application claims priority from German Patent Application Serial No. 10 2009 051 613.5, filed Nov. 2, 2009, the entire contents of which is herein incorporated fully by reference. Additionally, this application is related to German Patent Application Ser. No. 10 2009 051 611.5, filed Nov. 2, 2009 and filed subsequently in the United States as U.S. patent application Ser. No. 12/859,005 filed Aug. 18, 2010 issued as U.S. Pat. No. 8,201,456 on Jun. 19, 2012, the entire contents of each of which is herein incorporated fully by reference.

FIGURE FOR PUBLICATION

FIG. 1.

BACKGROUND OF THE INVENTION

1. Field of the Invention

The present invention relates to a measuring cell. More specifically, the present invention relates to a measuring cell with a base body, a measurement membrane arranged on the base body, and a measurement device, with a clearance between the measurement membrane and the base body filled with a fluid which presents an increased heat capacitance ($\kappa$) compared to air.

2. Description of the Related Art

The related art involves pressure measuring cells. Such measuring cells are known in the state of the art, for example, as pressure measuring cells for the capacitive detection of a pressure applied externally to the measuring cell. Such a capacitive pressure measuring cell presents a base body, and a measurement membrane arranged on the base body, where, on facing surfaces of the measurement membrane and of the base body, laminar electrodes are arranged to form a capacitance. When pressure is applied to the measurement membrane, the separation between the measurement membrane and the base body changes. Thus, the capacitance of the capacitor formed by the measuring electrodes changes, so that it becomes possible to detect an applied pressure.

In measuring cells constructed according to this principle, it is problematic that, due to rapid temperature changes, so-called thermal shocks, for example, a pressure jump from 20° C. to 80° C., and because of a relatively slow temperature equalization within the measuring cell, structure-mechanical deformations of the measuring cell occur, which, due to the resulting bending of the measurement membrane, produce a change in the measured value, although no pressure change has occurred. If the temperature changes are slow, the temperatures equalize due to heat conduction via a glass solder connection between the measurement membrane and the base body, so that no deformations of the measuring cell and particularly of the measurement membrane are caused. However, in case of rapid temperature changes, such as those that occur, for example, during thermal shock, the temperature equalization between the measurement membrane and the base body occurs only after the longer time, so that, due to the temperature gradient, the membrane undergoes a deformation with respect to the base body, the capacitance conditions inside the cell change, and a pressure change is simulated.

By compensating for such erroneous measurements, it is known, in the state of the art, (as is taught, for example in EP 1 186 875 B1), to arrange a temperature sensor for the acquisition of temperature changes in a glass solder connection, by means of which the measurement membrane is arranged on the base body. This temperature allows distinguishing between temperature changes with a steep temperature gradient and actual pressure changes, and compensating the issued values with the help of electronic processing.

Additionally, attempts have been made to use a bending line of the measurement membrane, and the resulting changed capacitance value, to detect the occurrence of a thermal shock and to correct the incorrect measured value.

What is not appreciated by the prior art is that the presence of a thermal shock can only be detected from incorrect measured values, and consequently a very rapid signal processing of the measured values is needed. Another problem is that it is not possible to reliably detect temporally overlapping events, such as, for example, the overlap between a pressure pulse and a thermal shock, and process it.

Accordingly, there is a need for an improved measuring cell that operates in such a way that the effects of thermal shocks and the resulting measurement errors are reduced.

ASPECTS AND SUMMARY OF THE INVENTION

An aspect of the present invention is to provide a measuring cell that operates in such a way that the effects of thermal shocks and the resulting measurement errors are reduced.

According to an embodiment of the present invention there is provided a measuring cell having a measurement membrane which is arranged on the base body, and a measurement device, where a clearance between the measurement membrane and the base body is filled with a fluid which presents an increased heat conductivity compared to air. Because the fluid in the clearance presents an increased heat conductivity, temperature jumps induced by thermal shock are transferred more rapidly from the measurement membrane to the base body of the measuring cell, so that structure-mechanical tensions in the measuring cell can be dissipated more rapidly or reduced in their magnitude due to the smaller temperature gradient.

It is advantageous here if the measurement device presents a first measuring element which is arranged on the measurement membrane, and a second element which is arranged on the base body. The measuring elements can be designed, for example, as measuring electrodes in the form of flat metallizations of identical size, and form a measuring capacitance for the measurement of shifts of the measurement membrane with respect to the base body. A capacitive measuring cell which has been formed in this way can be used, for example, as a pressure measuring cell, and, in terms of its basic design it has been researched very well in the state of the art, and consequently can be used for a very broad number of applications.

In a variant of the invention, around the measuring electrodes, measuring electrodes having an annular shape are arranged by means of which a reference capacitance is formed. In the case of a membrane which has a circular shape, these reference electrodes can be arranged in a marginal area, close to a connection between the base body and the measurement membrane, which connection can be established, for example, via a solder ring, so that the value for the reference capacitance remains largely constant even in case of structure-mechanical deformations of the measuring cell or of the membrane. With the help of the reference capacitance, it is possible to normalize the value of a measuring capacitance, and as a result generate a dimensionless measured value which is independent of product-caused variations of a slot separation between the measurement membrane and the base body as well as of slow or quasi-static temperature changes.

For shifts in the membrane not to represent a resistance, it is advantageous if the fluid filled into the clearance is compressible. Therefore, it is advantageous if, as fluid, a gas is filled into the clearance. Because of their low reactivity, rare gases are given preference. In the main group of rare gases, helium has been found to be particularly suitable, because its permittivity is similar to that of air, and it presents a heat conductivity which is approximately 6 times higher.

Due to its approximately 7 times higher heat conductivity compared to air, hydrogen, moreover, could be suitable for filling the clearance. Because of the high reactivity of hydrogen and the high diffusion tendency of this gas, the fields of use of hydrogen are, however, limited.

To achieve an even higher heat conductivity of the fluid, it can be advantageous to have recourse to liquids to fill the clearance. Possible liquids are, for example, glycerol whose heat conductivity is approximately 12 times higher than that of air, or water whose heat conductivity is approximately 23 times higher compared to air.

With regard to the materials used, one must take into consideration the heat conductivity, the electrical and insulation behavior as well as the effect on the dynamic behavior of the measuring cell.

To prevent effects of the fluid filling on the pressure detection behavior of the measuring cell, it is also advantageous to provide a pressure compensation device. By means of such a pressure compensation device it is possible to ensure, for example, that isobaric conditions always exist in the interior of the measuring cell, so that all external pressures are acquired identically.

The pressure compensation device can be arranged, for example, on the back side of a measuring cell, that is on the side of the measuring cell which faces the measurement device, and connected by a duct which leads through the base body of the measuring cell to the clearance between the measurement membrane and the base body. Due to the backside arrangement of the pressure compensation device, it is possible to maintain the front-side construction volume of the measuring cell constant, while still being able to use the advantages of a pressure compensation device.

Such a pressure compensation device can be designed, for example, as a pressure compensation membrane which is connected by means of an intermediate layer to the base body. Between the pressure compensation membrane and the base body, it is possible, for example, to form an additional clearance, so that a volume of the pressure compensation device is consequently increased. Such a pressure compensation membrane can dynamically compensate for pressure variations in the interior of the measuring cell, and thus ensure constant pressure conditions in the interior of the cell.

An additional possibility consists in designing the pressure compensation device as an expansion device or by means of a spring loaded piston. Both of the above-mentioned variants make it possible to ensure constant pressure conditions in the interior of the cell, by varying the volume filled with the fluid, for example, by thermally caused expansion of the fluid.

To further reduce the effects of a thermal shock, one can provide an intermediate membrane between the measurement membrane and the base body, where the first measurement membrane continues to be arranged on the measurement membrane. The second measuring element sits on the intermediate membrane, and is thus arranged on an element of the measuring cell, which undergoes thermally caused deformations in the same way as the measurement membrane, so that, as a result, thermally induced measurement errors can be largely prevented.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
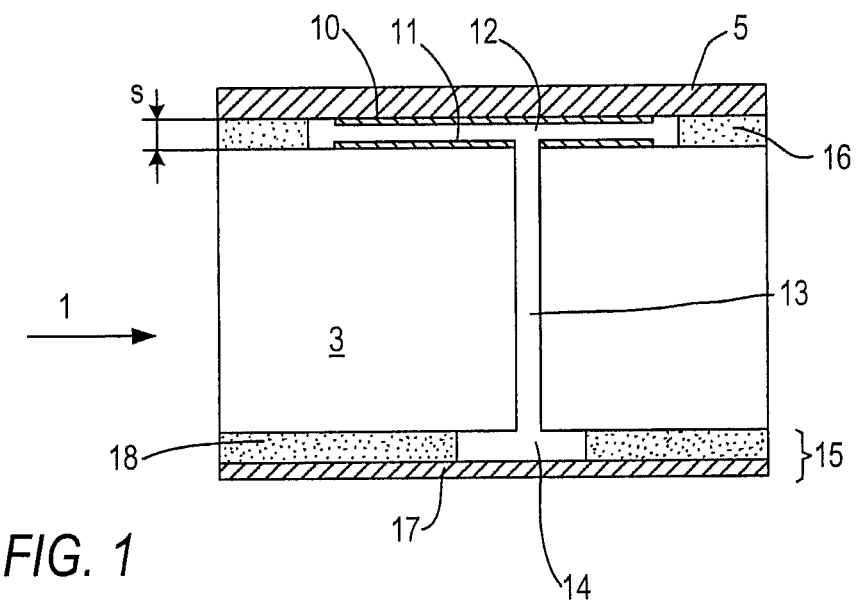
FIG. 1 is a diagram of a first embodiment example of a measuring cell, according to the invention, with a pressure compensation membrane utilized as a pressure compensation device.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1 shows a first embodiment example of a measuring cell 1 according to the invention with a base body 3, a measurement membrane 5 which is arranged over a solder ring 16 on the base body 3, as well as measuring electrodes 10, 11 which are arranged on the measurement membrane 5 as well as on the base body 3. A clearance 12 formed between the measurement membrane 5 and the base body 3 is connected via a duct 13 to a pressure compensation device 15, which, in the embodiment example, is formed by a pressure compensation membrane 17 which is connected via a connection layer 18 to the back side of the base body 3. The pressure compensation device 15 presents an additional clearance 14 between the pressure compensation membrane 17 and the back side of the base body 3, which serves to guarantee isobaric pressure conditions in the interior of the measuring cell 1. Both the clearance 12 and also the additional clearance 14 are filled with a fluid which presents an increased heat conductivity κ compared to air.

For detection of the pressure exerted on the measurement membrane 5, the measuring electrodes 10, 11, which are arranged on the measurement membrane 5 and on the base body 3, form a measuring capacitance $C_M$, whose size is determined by the surface area of the measuring electrodes 10, 11, the permittivity of the medium located between the measuring electrodes 10, 11, as well as the slot separation s which is determined by the solder ring 16. If the radius of the measuring electrodes 10, 11 is in the range of 5-6 mm, and the slot separation is approximately 16 the value of the measuring capacitance $C_M$ is approximately 50 pF. Due to pressure acting on the measurement membrane 5, the slot separation s between the measuring electrodes 10, 11 changes, so that, via a change in capacitance the pressure exerted from the exterior can be determined. As a result of a thermal shock, for example, a temperature jump from 20° C. to 80° C. in less than one second, structure-mechanical deformations of the measuring cell 1 can occur. These temperature θ deformations occur, because the measurement membrane 5 expands more strongly under the higher temperature than the base body 3, and due to its radial attachment for the compensation of these tensions, it undergoes an outward arching. Due to the arching of the measurement membrane 5, the slot separation s between the measurement membrane 5 and the base body 3 increases, in the case of a 1-μm air-filled measuring cell 1, by up to 2.1 μm, so that, due to the temperature shock, the measuring cell 1 detects a presumed pressure drop. By filling the clearance 12 with helium, one can, on the one hand, reduce a maximum slot change $\Delta s_{max}$ from 2.1 μm to 1.5 μm, and, on the other hand, one can produce a more rapid compensation for a thermally caused enlargement of the slot separation s.

Figure 5:
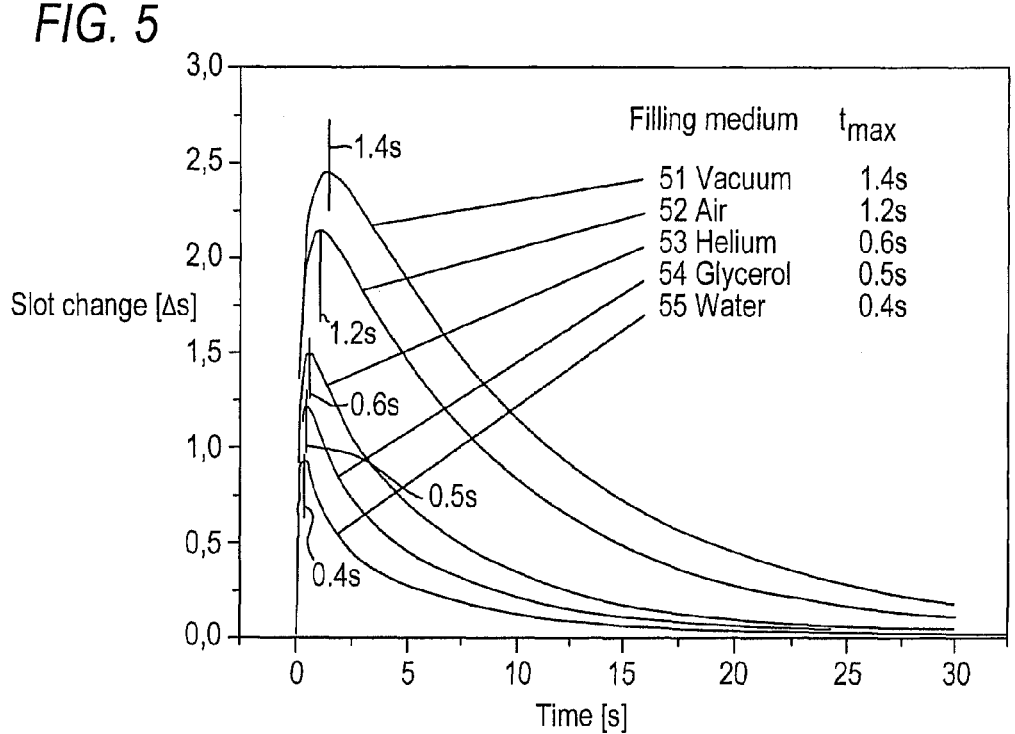
FIG. 5 is a chart of the comparison of the change in the capacitive slot over time for different filling media.

As is shown in FIG. 5, by filling the clearance 12 with helium, the slot change Δs can be returned from its maximum value of $\Delta s_{max}$=1.5 μm within approximately 7 seconds to 0.5 μm, whereas, in the case of a measuring cell filled with air, more than 15 seconds are needed to return the slot change $\Delta s_{max}$ to 0.5 μm. As shown in FIG. 5, the maximum value of the slot change Δs, in case of a filling with glycerol or water, can be reduced even further; however, these filling substances are less suitable because of the incompressibility of liquids than gases for use in pressure measuring cells 1.

Figure 2:
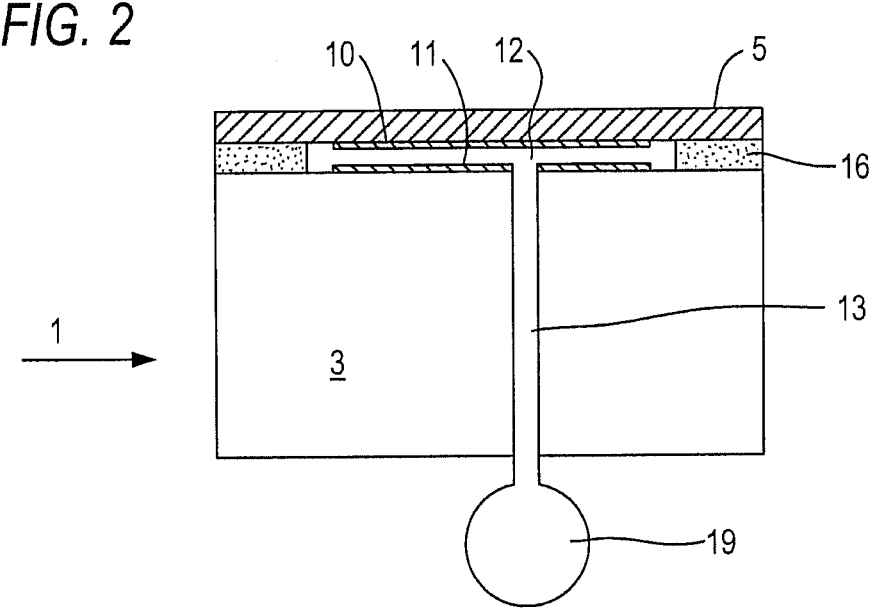
FIG. 2 is a diagram of an alternative design of the pressure compensation device with an expansion vessel.

FIG. 2 shows an additional embodiment example of a pressure measuring cell 1 according to the invention, where, compared to the pressure measuring cell represented in FIG. 1, the pressure compensation device 15 is formed by an expansion vessel 19. The expansion vessel 19 presents a variable volume, so that, in case of external pressures on the measurement membrane 5 due to a variation in the volume of the expansion vessel 19, isobaric pressure conditions in the interior of the measuring cell 1 can be ensured. An expansion vessel 19 can be formed, for example, from a pressure or folded bellows.

Figure 3:
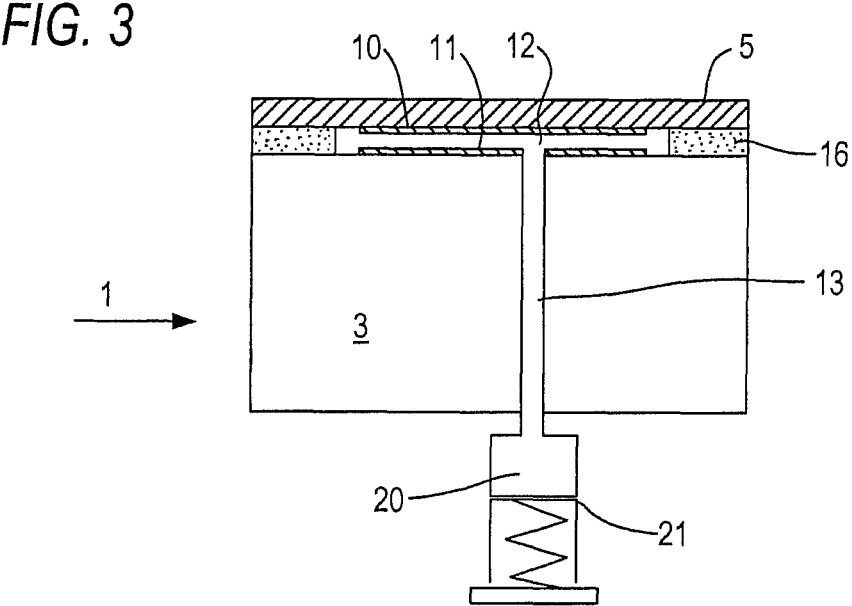
FIG. 3 is a diagram of an additional alternative design of the pressure compensation device with a spring loaded piston.

FIG. 3 presents an additional embodiment example of a measuring cell 1 according to the invention, where the pressure compensation device 15 is formed by a pressure compensation container 20 with a spring loaded piston 21. By means of a pressure compensation container 20 with a spring loaded piston 21, one can ensure, in a similar manner as with the expansion vessel 19 or the pressure compensation membrane 17, that constant pressure conditions exist in the measuring cell 1, and thus that external pressure effects are detected under constant conditions.

Figure 4:
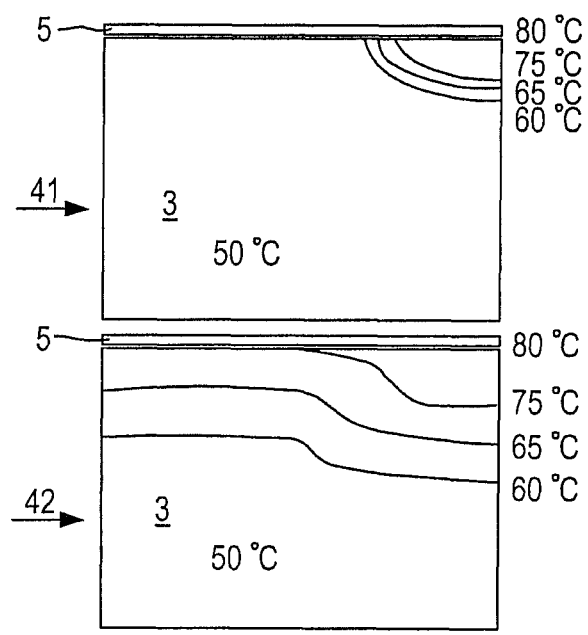
FIG. 4 is a comparison chart of the temperature distribution within a measuring cell according to the state of the art and within a measuring cell according to the invention, 8.2 seconds after a thermal shock.

FIG. 4 shows a comparison of the temperature distribution 8.2 seconds after exposure to a thermal shock, in the present case a temperature jump from 20° C. to 80° C., where the reference numeral 41 is used to mark the schematic representation of a measuring cell 1 filled with air, and the reference numeral 42 is used to mark the schematic representation of a helium-filled measuring cell 1. The schematic representations 41, 42 show a centrical section through the measuring cell 1 vertically to the measurement membrane 5. The illustration shows half of a measuring cell 1, where the representation leads from the center of the measuring cell, arranged on the left, to the margin of the measuring cell, that is the area in which the solder ring 16 sits, on the right side.

As one can see in the representation 41, heat propagation occurs, starting from the measurement membrane 5 on which the thermal shock acts, primarily via the solder ring 16, resulting in a temperature profile where ellipsoid isotherms spread starting from the solder ring 16, in the base body 3 of the measuring cell 1.

In the helium-filled measuring cell 1 shown in the representation 42, one can clearly see that, at the same time as in the upper representation, the isotherms have progressed substantially further into the base body 3, and that the isotherms spread not only starting from the connection via the solder ring 16, but also starting from the helium-filled clearance 12.

Figure 6:
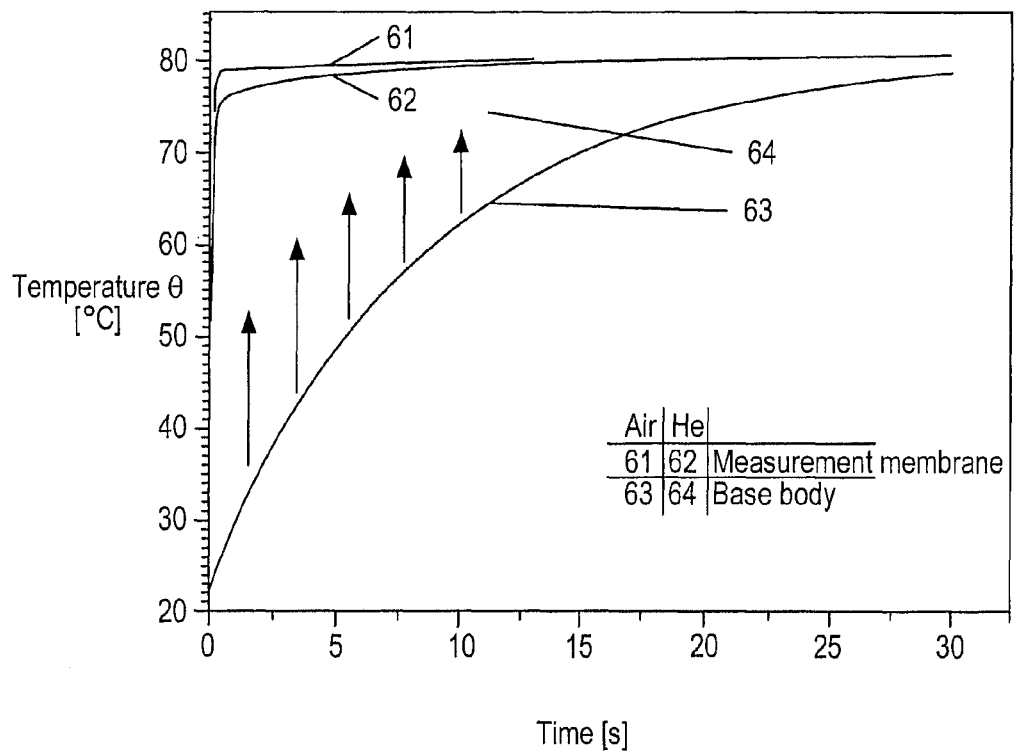
FIG. 6 is a chart of the comparison of the temperature development on the measurement membrane as well as on the upper side of the base body for air and helium as filling medium.

This more rapid heat propagation into the base body 3, which is noticeable particularly on the upper side of the base body 3, that is in the area of the second measuring electrode 11, is represented for clarification in FIG. 6 in comparison to a standard measuring cell 1. The temperature plot in FIG. 6 is represented in each case in the center of the measuring cell 1. The characteristic lines 61 and 63 denote the temperature course in an air filled measuring cell 1, where the characteristic line 61 denotes the temperature course in the center of the measurement membrane 5, and the characteristic line [sic] the temperature course in the center of the surface of the base body 3. The characteristic lines 62 and 64 relate to the temperature courses for a helium-filled measuring cell 1, where the characteristic line 62 refers to the course in the center of the measurement membrane 5, and the characteristic line 64 correspondingly relates to the temperature course in the center of the surface of the base body 3.

In an air-filled measuring cell 1, the temperature θ increases abruptly to 79° C. with the measurement membrane 5 during exposure to a thermal shock, in the present example, in less than 1 sec, and then it approaches nearly linearly the maximum temperature θ of 80° C. (see characteristic line 61). The temperature θ on the upper side of the base body 3 increases only relatively slowly, and after 10 seconds it reaches the value of approximately 62° C., after 20 seconds a value of approximately 73° C., and in the remaining measurement range it approaches the value of 80° C. asymptotically until 30 seconds have elapsed (see characteristic line 63).

In contrast, the temperature θ of the measurement membrane 5, in a helium-filled measuring cell, increases within the first second only to 75° C., and then it increases up to 5 seconds after exposure to the thermal shock to approximately 78° C., and then it approaches, until approximately 15 seconds after the thermal shock, the maximum value of 80° C., approximately linearly (see characteristic line 62). Because of the increased thermal conductivity κ of helium, the temperature θ of the measurement membrane 5 increases after a thermal shock thus also more slowly than with a conventional measuring cell. The temperature θ of the surface of the base body 3 increases considerably more rapidly in comparison to the temperature course with an air-filled measuring cell 1, so that the value of 62° C., which is reached only after 10 seconds with the air filled cell, is already reached after approximately 3 seconds, and, during the further course, the value of 74° C. is already reached after approximately 11 seconds (see characteristic line 64).

The effects on the slot change Δs between the measurement membrane 5 and the base body 3 are shown in FIG. 5 in comparison to different filling media. In the diagram shown in FIG. 5, the course of the slot change Δs for different filling media in a time range from 0 to 30 seconds after exposure to the thermal shock is plotted. In addition, in the individual characteristic lines, the times $t_{max}$, within which a maximum slot change $\Delta s_{max}$ is reached, is recorded. From a comparison of the characteristic lines 52 and 53 for an air-filled and a helium-filled measuring cell 1, it is apparent that the maximum slot change $\Delta s_{max}$ of approximately 2.2 μm can be reduced to 1.5 μm. An additional reduction of the maximum slot change $\Delta s_{max}$ to 1.25 μm is possible by using glycerol, and to 1.0 μm by using water, as filling medium. A comparison of the characteristic line 52 for an air-filled measuring cell 1 as well as of the characteristic line 53 for a helium-filled measuring cell 1 also shows that the maximum slot change $\Delta s_{max}$ in the case of a helium-filled measuring cell 1 is already reached after time $t_{max}$ of 0.6 sec, and after this time it also decreases much more rapidly than with the air-filled measuring cell 1, for which the maximum slot change $\Delta s_{max}$ is reached only after time $t_{max}$ of 1.2 sec. An additional comparison of the characteristic lines 52 and 53 shows that, in a helium-filled measuring cell 1, a return of the slot change Δs to 0.25 μm occurs already after approximately 12.5 sec, whereas, in the case of an air-filled measuring cell 1, the return takes approximately 22.5 sec.

Figure 7:
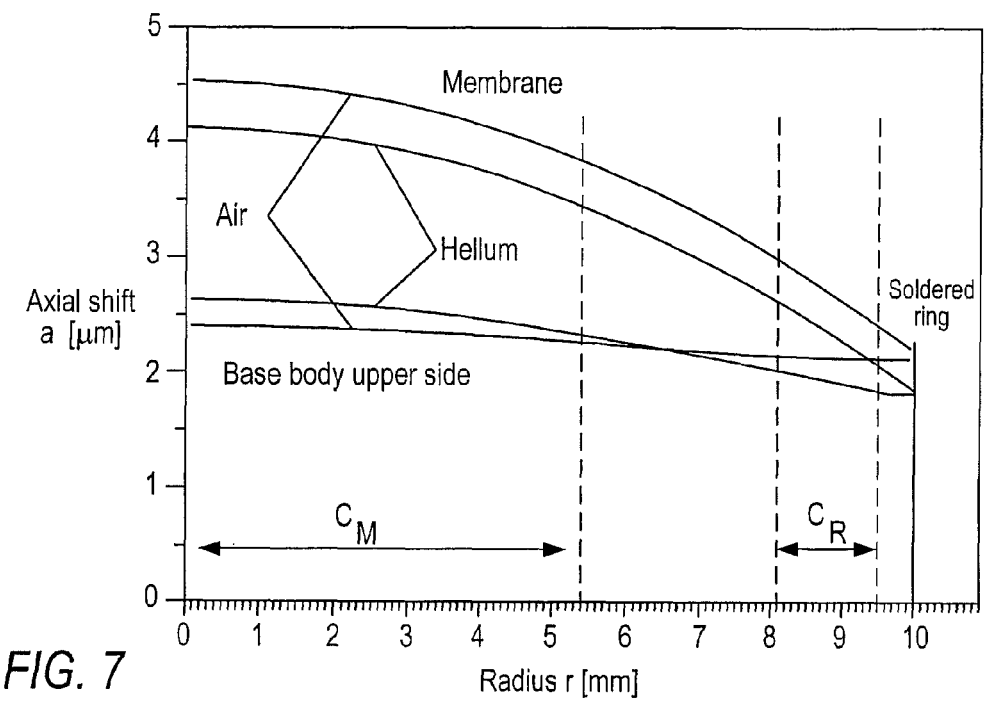
FIG. 7 is a chart of the comparison of the maximum axial shift of the measurement membrane as well as of the base body upper side for air and helium.

As in FIG. 7, an axial shift a of the measurement membrane 5 and of the upper side of the base body 3 at the time of the maximum slot change $\Delta s_{max}$ is represented, as determined in FIG. 5, for an air-filled measuring cell 1 as well as for a helium-filled measuring cell 1 as is shown in FIG. 6. The axial shift a, starting from the middle of the measuring cell 1 on, is represented independently of the radius, and plotted up to the time when the solder ring 16 is reached after 10 mm. In FIG. 7, the areas are also plotted in which the measuring capacitance $C_M$ and a reference capacitance $C_R$, or the measurement and reference electrodes 10, 11, 23 provided for this purpose, are arranged. Using the reference capacitance $C_R$, which is arranged in an area close to the solder ring 16, a small change in the capacitive measurement slot between the measurement membrane 5 and the base body 3 makes it possible to normalize the capacitance determined by means of the measuring capacitance $C_M$, and in this way determine a measured value M, which is independent of the production-caused variations of the measurement slot as well as of slow and quasi-static temperature changes.

As one can see in the diagram of FIG. 7, the axial shift a is smaller in the case of a helium-filled measuring cell 1 for the measurement membrane 5, and greater for the base body upper side, resulting in the reduction of the maximum slot change $\Delta s_{max}$ as represented in FIG. 5.

Figure 8:
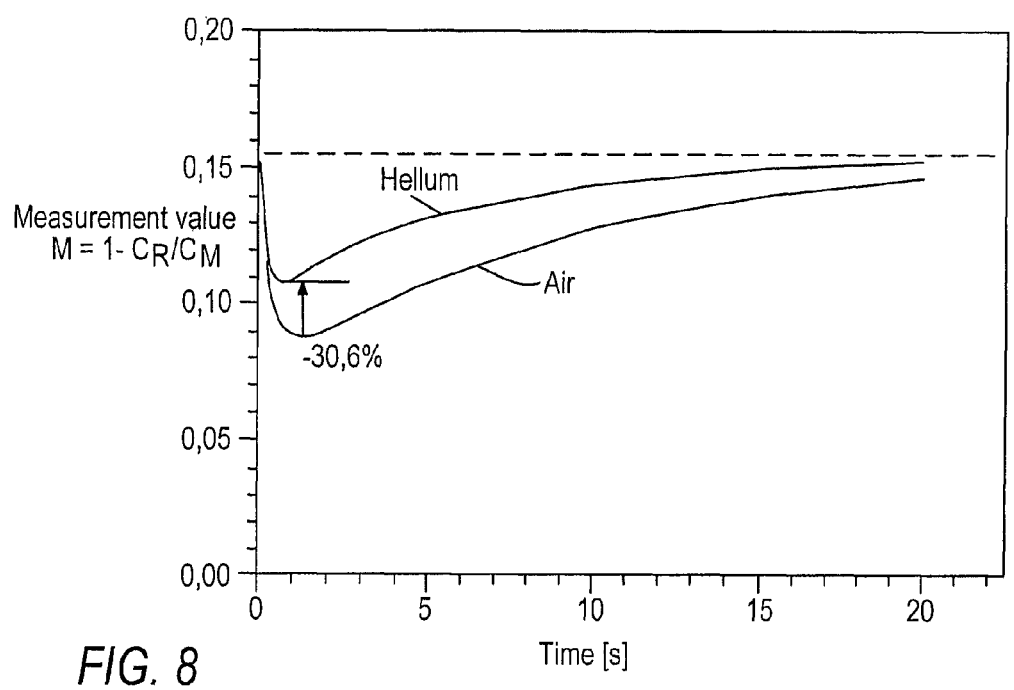
FIG. 8 is a chart of the development of the measured values over time for a measuring cell according to the state of the art as well as for a measuring cell according to the invention.

FIG. 8 shows a representation of a determined measured value $M=1-C_R/C_M$ of an air-filled measuring cell 1 and a helium-filled measuring cell 1 after a thermal shock for comparison. As is shown in FIG. 8, the maximum effect of the thermal shock can be reduced by more than 30% by using helium as filling medium, so that, as a result, the probability of measurement errors can be decreased considerably.

Figure 9:
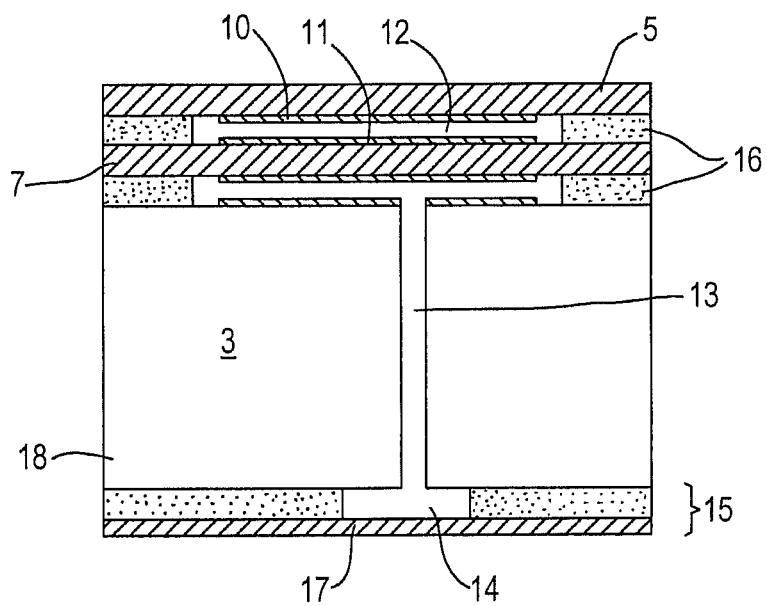
FIG. 9 is a diagram of a measuring cell according to the invention with additional intermediate membrane.

FIG. 9 shows an additional further development of a measuring cell 1 from FIG. 1, where, in addition to the filling of the clearance 12 between the measurement membrane 5 and the base body 3, an intermediate membrane 7, as well as additional electrodes 25 are provided for the detection of a thermal shock. Due to the intermediate membrane 7, the effects of a thermal shock on the determined measured values can be reduced further, because, due to a lower heat capacity, the intermediate membrane 7 absorbs these thermal effects much more rapidly than the base body 3, and therefore experiences them in nearly the same manner as the measurement membrane 5. The additional electrodes 25 arranged between the intermediate membrane 7 and the base body 3 can be used, because a pressure applied to the measurement membrane 5 remains without effects for the intermediate membrane 7, for the detection of structure-mechanical deformations caused by a thermal shock, so that an additional measured value compensation is possible, based on the measured values determined with the additional electrodes 25.

To ensure constant pressure conditions in the interior of the measuring cell 1, it is advantageous to provide the intermediate membrane 7 with perforations, so that a fluid that has been filled into the clearance 12 can circulate without impediment, and, moreover, flow into the pressure compensation device 15.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A measuring cell, said measuring cell comprising:
   (a) a base body:
   (b) a measurement membrane, wherein said measurement membrane is arranged on said base body;
   (c) a clearance, and wherein said clearance is:
      (i) located between said measurement membrane and said base body; and
      (ii) is filled with a fluid which presents an increased heat capacitance (κ) compared to air;
   (d) a measurement device; and
   wherein said measuring cell further comprises a pressure compensation device.

2. A measuring cell according to claim 1, wherein said measurement device comprises:
   (a) a first measuring element, wherein said first measuring element is arranged on said measurement membrane; and
   (b) a second measuring element, wherein said second measuring element is arranged on said base body.

3. A measuring cell according to claim 2, wherein said first measuring element and said second measurement element are each measuring electrodes.

4. A measuring cell according to claim 2, wherein said measuring electrodes are designed as flat metallizations of identical size, and form a measuring capacitance ($C_M$).

5. A measuring cell according to claim 2, wherein an intermediate membrane is provided between said measurement membrane and said base body, and wherein:
   (a) said first measuring element is provided on said measurement membrane; and
   (b) said second measuring element is arranged on said intermediate membrane.

6. A measuring cell according to claim 1, wherein a set of one or more reference electrodes, having an annular shape, are provided for the formation of a reference capacitance ($C_R$).

7. A measuring cell according to claim 1, wherein said fluid is a gas.

8. A measuring cell according to claim 7, wherein said gas is a rare gas.

9. A measuring cell according to claim 8, wherein said rare gas is selected from the group comprising:
   (a) helium; and
   (b) hydrogen.

10. A measuring cell according to claim 1, wherein said fluid is a liquid.

11. A measuring cell according to claim 10, wherein said fluid is selected from the group comprising:
    (a) glycerol; and
    (b) water.

12. A measuring cell according to claim 1, wherein said pressure compensation device is connected by a duct to said clearance.

13. A measuring cell according to claim 12, wherein a second clearance is formed between said pressure compensation membrane and said base body.

14. A measuring cell according to claim 1, wherein said pressure compensation device is designed as a pressure compensation membrane which is connected by means of a connection layer to said base body.

15. A measuring cell according to claim 1, wherein said pressure compensation device is an expansion vessel, and wherein said expansion vessel presents a variable volume.

16. A measuring cell according to claim 1, wherein said pressure compensation device further comprises:
    (a) a pressure compensation container; and
    (b) a spring loaded piston.

17. A measuring cell, said measuring cell comprising:
    (a) a base body;
    (b) a measurement membrane, wherein said measurement membrane is arranged on said base body;
    (c) a clearance, and wherein said clearance is:
        (i) located between said measurement membrane and said base body; and
        (ii) is filled with a fluid which presents an increased heat capacitance ($\kappa$) compared to air;
    (d) a measurement device, wherein said measurement device further comprises:
        (i) a first measuring element, wherein said first measuring element is arranged on said measurement membrane; and
        (ii) a second measuring element, wherein said second measuring element is arranged on said base body; and
    (e) a pressure compensation device.

18. A measuring cell according to claim 17, wherein said pressure compensation device is designed as a pressure compensation membrane which is connected by means of a connection layer to said base body.

19. A method for measuring a pressure state, said method comprising the steps of:
    (a) introducing a pressure change to a measurement cell wherein said measurement cell comprises:
        (i) a base body;
        (ii) a measurement membrane, wherein said measurement membrane is arranged on said base body;
        (iii) a clearance, and wherein said clearance is:
            (1) located between said measurement membrane and said base body; and
            (2) is filled with a fluid which presents an increased heat capacitance ($\kappa$) compared to air;
        (iv) a measurement device, wherein said measurement device further comprises:
            (1) a first measuring element, wherein said first measuring element is arranged on said measurement membrane; and
            (2) a second measuring element, wherein said second measuring element is arranged on said base body; and
        (v) a pressure compensation device;
    (b) detecting said pressure change imposed on said measurement membrane to form a measuring capacitance; and
    (c) measuring, via said measuring device, a magnitude of said pressure change.

* * * * *